(12) United States Patent
Mao et al.

(10) Patent No.: US 10,710,244 B2
(45) Date of Patent: Jul. 14, 2020

(54) ROBOT CONTROL USING GESTURES

(71) Applicant: Beijing Airlango Technology Co., Ltd., Beijing (CN)

(72) Inventors: Yinian Mao, Beijing (CN); Xinmin Liu, Beijing (CN)

(73) Assignee: Beijing Airlango Technology Co., Ltd., Beijing (CN)

( * ) Notice: Subject to any disclaimer, the term of this patent is extended or adjusted under 35 U.S.C. 154(b) by 178 days.

(21) Appl. No.: 15/627,506

(22) Filed: Jun. 20, 2017

(65) Prior Publication Data

US 2018/0001480 A1    Jan. 4, 2018

(30) Foreign Application Priority Data

Jun. 30, 2016   (CN) .......................... 2016 1 0509806

(51) Int. Cl.
| | |
|---|---|
| *B25J 9/16* | (2006.01) |
| *G06F 3/03* | (2006.01) |
| *G06K 9/62* | (2006.01) |
| *G06F 3/01* | (2006.01) |

(Continued)

(52) U.S. Cl.
CPC .......... *B25J 9/1697* (2013.01); *B25J 9/1656* (2013.01); *G06F 3/017* (2013.01); *G06F 3/0304* (2013.01); *G06K 9/00288* (2013.01); *G06K 9/00355* (2013.01); *G06K 9/00375* (2013.01); *G06K 9/3233* (2013.01); *G06K 9/6269* (2013.01);

(Continued)

(58) Field of Classification Search
CPC .................. B25J 9/1656; B25J 9/1697; G05B 2219/23021; G05B 2219/35444; G06F 3/017; G06F 3/0304; G06K 9/00288; G06K 9/00355; G06K 9/00375; G06K 9/3233

See application file for complete search history.

(56) References Cited

U.S. PATENT DOCUMENTS 9,129,154 B2 *   9/2015   Kim .................... G06K 9/00355
9,459,620 B1 *  10/2016   Schaffalitzky ....... G05D 1/0016
(Continued)

FOREIGN PATENT DOCUMENTS

| CN | 101853071 A | 10/2010 |
|---|---|---|
| CN | 103365294 A | 10/2013 |

(Continued)

OTHER PUBLICATIONS

State Intellectual Property Office of the People's Republic of China, Office Action and Search Report Issued in Application No. 201610509806.2, dated Oct. 18, 2018, 14 pages. (Submitted with Partial Translation).

(Continued)

*Primary Examiner* — Dale Moyer
(74) *Attorney, Agent, or Firm* — IPro, PLLC

(57) ABSTRACT

A method and a device for operating a robot are provided. According to an example of the method, information of a first gesture is acquired from a group of gestures of an operator, each gesture from the group of gestures corresponding to an operation instruction from a group of operation instructions. A first operation instruction from the group of operation instructions is obtained based on the acquired information of the first gesture, the first operation corresponding to the first gesture. The first operation instruction is executed.

18 Claims, 6 Drawing Sheets

(51) Int. Cl.
*G06K 9/00* (2006.01)
*G06K 9/32* (2006.01)

(52) U.S. Cl.
CPC .............. *G05B 2219/23021* (2013.01); *G05B 2219/35444* (2013.01)

(56) References Cited

U.S. PATENT DOCUMENTS

| | | | | |
|---|---|---|---|---|
| 2008/0085048 | A1* | 4/2008 | Venetsky | G06K 9/00355 382/153 |
| 2010/0235034 | A1* | 9/2010 | Higgins | G05D 1/0083 701/28 |
| 2011/0001813 | A1* | 1/2011 | Kim | G06K 9/00355 348/77 |
| 2015/0131855 | A1* | 5/2015 | Hanzawa | G06F 3/0304 382/103 |
| 2015/0353206 | A1* | 12/2015 | Wang | B64F 1/00 244/114 R |
| 2016/0266579 | A1* | 9/2016 | Chen | G05D 1/0038 |
| 2016/0313742 | A1* | 10/2016 | Wang | G05D 1/0669 |
| 2017/0235308 | A1* | 8/2017 | Gordon | G05D 1/0016 701/2 |
| 2018/0196419 | A1* | 7/2018 | Wang | G06F 3/0304 |

FOREIGN PATENT DOCUMENTS

| | | |
|---|---|---|
| CN | 103903318 A | 7/2014 |
| CN | 104049760 A | 9/2014 |
| CN | 104808799 A | 7/2015 |
| CN | 105095882 A | 11/2015 |
| CN | 105182983 A | 12/2015 |
| CN | 105223957 A | 1/2016 |
| CN | 105653037 A | 6/2016 |
| CN | 106203299 A | 12/2016 |

OTHER PUBLICATIONS

State Intellectual Property Office of the People's Republic of China, Office Action and Search Report Issued in Application No. 201610509806.2, dated Apr. 15, 2019, 13 pages. (Submitted with Machine Translation).

ISA State Intellectual Property Office of the People's Republic of China, International Search Report Issued in Application No. PCT/CN2017/090357, dated Aug. 30, 2017, WIPO, 3 pages.

ISA State Intellectual Property Office of the People's Republic of China, Written Opinion of the International Searching Authority Issued in Application No. PCT/CN2017/090357, dated Aug. 30, 2017, WIPO, 4 pages.

* cited by examiner

ROBOT CONTROL USING GESTURES

TECHNICAL FIELD

The present disclosure relates to the technical field of a robot.

BACKGROUND

Various types of robots, such as civilian unmanned aerial vehicles, industrial robots, and consumer robots, have gone through rapid developments in terms of both technology and market adoption. A robot is a mechanical device that can automatically perform a job, and rely on its own power and control capabilities to implement different functions. A robot may function by receiving human commands or running pre-scheduled programs, and may also act based on strategies established by artificial intelligence.

An operator may remotely control a robot to perform relevant operations. Specifically, the operator may use a manual remote control to issue an operational command to the robot wirelessly. The robot executes an operation specified by the operational command after receiving the operation command so as to complete the relevant function.

However, the operating method described above may demand a very high level of entry barrier for the operator, and thus has low operability for the operator.

SUMMARY

The present disclosure provides a method for operating a robot, the method including:

acquiring information of a first gesture from a group of gestures of an operator, each gesture from the group of gestures corresponding to an operation instruction from a group of operation instructions;

obtaining, based on the acquired information of the first gesture, a first operation instruction from the group of operation instructions, the first operation instruction corresponding to the first gesture; and executing the first operation instruction.

In an example, acquiring the information of the first gesture of the operator includes:

capturing an image using a camera;

identifying a Region Of Interest (ROI) from the captured image;

determining whether the ROI indicates the operator; and acquiring, based on the captured image, the information of the first gesture if the ROI indicates the operator.

In an example, determining whether the ROI indicates the operator includes:

calculating a similarity between face feature information of the ROI and pre-configured face feature information of the operator, and determining that the ROI indicates the operator if the calculated similarity is greater than a predetermined threshold.

In an example, the captured image is a first image, the method further includes capturing a second image using the camera, the determining whether the ROI indicates the operator includes:

acquiring, based on the second image, information of a second gesture;

determining whether the second gesture matches a pre-configured gesture password; and determining that the ROI of the first image indicates the operator if the second gesture matches the pre-configured gesture password.

In an example, the pre-configured gesture password is associated with a posture or gesture of the operator, and the further includes:

executing the first operation instruction from the group of operation instructions if the second gesture matches the pre-configured gesture password.

In an example, acquiring the information of the first gesture includes:

identifying, from the captured image, a region associated with the operator;

analyzing the identified region to obtain a first feature vector;

calculating, for each gesture from the group of gestures, a similarity between the first feature vector and a feature vector of that gesture; and selecting the gesture having the highest similarity as the first gesture to be acquired.

In an example, the first gesture is a static gesture, wherein the information of the first gesture includes information of a status of a limb.

In another example, the first gesture is a dynamic gesture, and the information of the first gesture includes information of a movement of a limb.

The group of operation instructions includes an action instruction, a photographing instruction, an automatic charging instruction, a return-to-origin instruction, a take-off instruction, and a landing instruction.

The present disclosure provides a robot, including:

a processor; and a non-transitory storage medium storing machine-executable instructions, wherein by executing the machine-executable instructions, the processor is caused to:

acquire information of a first gesture from a group of gestures of an operator, each gesture from the group of gestures corresponding to an operation instruction from a group of operation instructions;

obtain, based on the acquired information of the first gesture, a first operation instruction from the group of operation instructions, the first operation instruction corresponding to the first gesture; and execute the first operation instruction.

In an example, when the processor is caused to acquire the information of the first gesture of the operator, the machine executable instructions further cause the processor to:

capture an image using a camera;

identify a Region Of Interest (ROI) from the captured image;

determine whether the ROI indicates the operator; and acquire, based on the captured image, the information of the first gesture if the ROI indicates the operator.

In an example, when the processor is caused to determine whether the ROI indicates the operator, the machine-executable instructions further cause the processor to:

calculate a similarity between face feature information of the ROI and pre-configured face feature information of the operator; and determine that the ROI indicates the operator if the calculated similarity is greater than a predetermined threshold.

In an example, the captured image is a first image, when the processor is caused to determine whether the ROI indicates the operator, the machine-executable instructions further cause the processor to:

capture a second image using the camera;

acquire, based on the second image, information of a second gesture;

determine whether the second gesture matches a pre-configured gesture password; and determine that the ROI of the first image indicates the operator if the second gesture matches the pre-configured gesture password.

In an example, the pre-configured gesture password indicates a posture or gesture of the operator, the machine-executable instructions further cause the processor to:

execute the first operation instruction from the group of operation instructions if the second gesture matches the pre-configured gesture password.

In an example, the processor is caused to acquire the information of the first gesture, the machine-executable instructions further cause the processor to:

identify, from the captured image, a region associated with the operator;

analyze the identified region to obtain a first feature vector;

calculate, for each gesture from the group of gestures, a similarity between the first feature vector and a feature vector of that gesture; and select the gesture having the highest similarity as the first gesture to be acquired.

In an example, the first gesture is a static gesture, and the information of the first gesture includes information of a state of a limb.

In another example, the first gesture is a dynamic gesture, and the information of the first gesture includes information of a movement of a limb.

The group of operation instructions include an action instruction, a photographing instruction, an automatic charging instruction, a return-to-origin instruction, a take-off instruction, and a landing instruction.

The present disclosure provides a method for operating a robot, including:

receiving, at a server, an image captured using a camera of the robot;

acquiring, at the server and based on the received image, information of a first gesture from a group of gestures of an operator, each gesture from the group of gestures corresponding to an operation instruction from a group of operation instructions;

obtaining, at the server and based on the acquired information of the first gesture, a first operation instruction from the group of operation instructions, the first operation instruction corresponding to the first gesture; and transmitting, from the server to the robot, the first operation instruction such that the robot executes the first operation instruction.

The present disclosure provides an apparatus for operating a robot, including:

a processor; and a non-transitory storage medium storing machine-executable instructions, wherein by executing the machine-executable instructions, the processor is caused to:

receive an image captured using a camera of the robot;

acquire, based on the received image, information of a first gesture from a group of gestures of an operator, each gesture from the group of gestures corresponding to an operation instruction from a group of operation instructions;

obtain, based on the acquired information of the first gesture, a first operation instruction from the group of operation instructions, the first operation instruction corresponding to the first gesture; and transmit the first operation instruction to the robot such that the robot executes the first operation instruction.

According to the above technical solution, in an example of the present disclosure, a robot may automatically execute an operation instruction corresponding to information of a gesture of an operator without requiring the operator to use a manual remote control to control the robot to perform relevant operations. This has a low requirement for entry barrier of the operator, and has high operability for the operator so that the robot is accepted by consumers more easily and more widely used. Moreover, the technical solution in this disclosure causes the robot to execute operation commands more effectively and more accurately.

BRIEF DESCRIPTION OF DRAWINGS

In order to more clearly illustrate the examples of the present disclosure or the technical solution in the prior art, the accompanying drawings, which are to be used in the examples of the present disclosure or the description of the prior art, will be briefly described below. It will be apparent that the accompanying drawings in the following description are merely examples described in the present disclosure and that other drawings may be obtained by those of ordinary skill in the art according to these drawings.

DETAILED DESCRIPTION

A method of operating a robot is proposed in the examples of the present disclosure. The method may be applied to robots such as intelligent photographing unmanned aerial vehicles, civil unmanned aerial vehicles, industrial robots and consumer robots. Herein the robot is a mechanical device that can automatically perform a job, and rely on its own power and control capabilities to implement different functions. The robot may receive human commands or run pre-scheduled programs, and may also act based on strategies established by artificial intelligence. For example, robots may be applied in game scenes, portrait photography (such as aerial photography), human-machine interaction and other application scenes.

Figure 1:
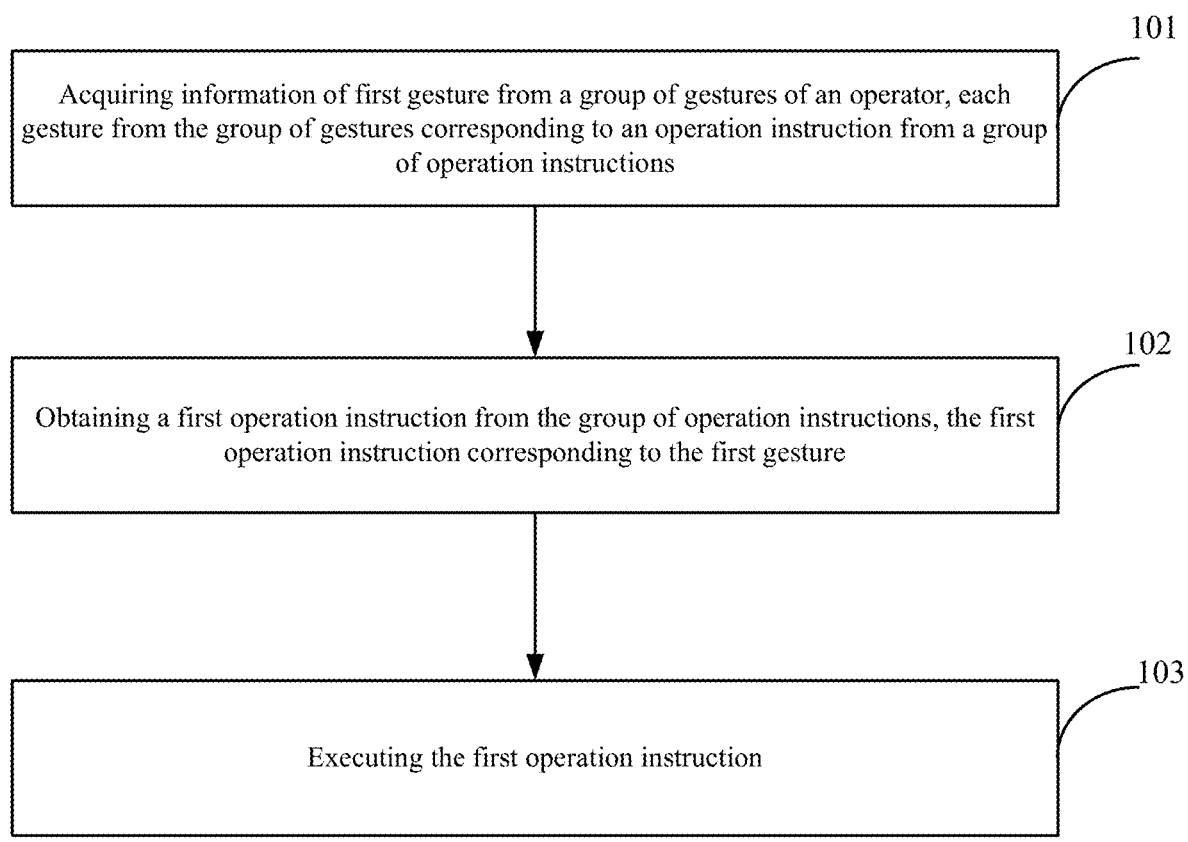
FIG. 1 is a flow diagram of a method of operating a robot in an example of the present disclosure.

In the above application scenario, as shown in FIG. 1, the method of operating the robot may include the following blocks.

At block 101, information of first gesture may be acquired from a group of gestures of an operator, each gesture from the group of gestures corresponding to an operation instruction from a group of operation instructions.

At block 102, a first operation instruction may be obtained from the group of operation instructions, the first operation instruction corresponding to the first gesture.

At block 103, the first operation instruction may be executed.

At block 101, in an example, the first gesture may specifically include, but is not limited to, static gesture and/or dynamic gesture. Information of the static gesture may specifically include information of a state of a limb. For example, the static gesture may be that the upper arm and the forearm of one hand are bent 90 degrees relative to each other. In addition, the dynamic gesture may specifically include a movement of a limb, for example, one hand waves from left to right. The first gesture may correspond to an operation instruction. A group of operation instructions together with a group of gestures may be pre-configured on the robot, each gesture from the group of gestures corresponding to an operation instruction from the group of instructions.

Figure 2:
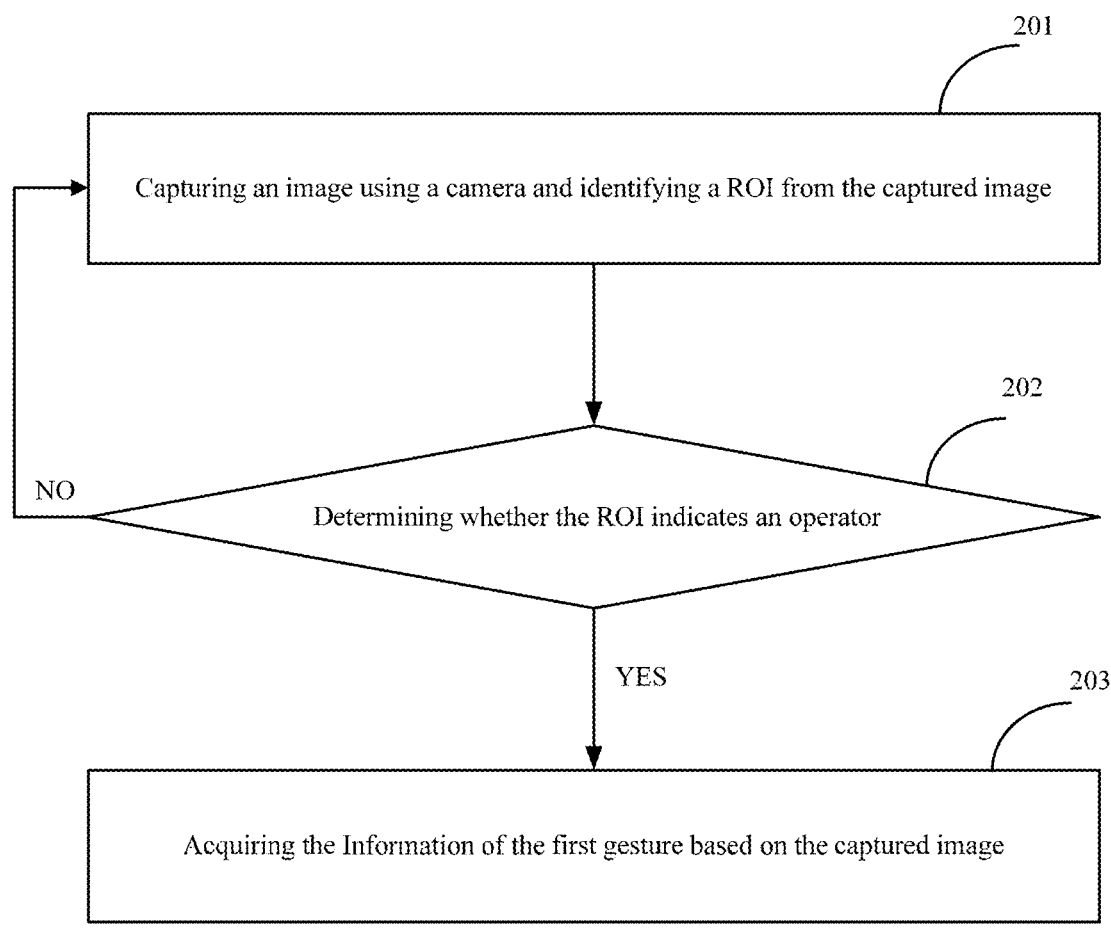
FIG. 2 is a flow diagram of a method of operating a robot in another example of the present disclosure.

The robot may also include a camera which may be a monocular camera, a binocular camera, or a non-visible-light camera (e.g., infrared light-sensitive imaging). As shown in FIG. 2, the process of acquiring the information of the first gesture of an operator may include, but is not limited to, the following blocks.

At block 201, an image may be captured using the camera and a region of interest (ROI) may be identified from the captured image.

At block 202, it may be determined whether the ROI indicates an operator. If the ROI indicates an operator, block 203 is performed; if not, the process returns to block 201 to continue capturing a new image.

At block 203, the information of the first gesture may be acquired based on the captured image.

In an example, when the first gesture is a static gesture, information of the static gesture of an operator may be determined by analysing an image. The number of images captured using the camera may be one or multiple, and the information of the first gesture of the operator may be analysed based on one or more first images. When the first gesture is a dynamic gesture, it is necessary to analyse multiple images to obtain the information of the dynamic gesture of the operator. Thus, the number of images captured using the camera may be multiple. The multiple images form a set of successive images, which may be a video. The information of the first gesture of the operator may be analysed based on the multiple images.

At block 201, after the operator controls to start the robot, the robot may capture an image (hereinafter, referred as a first image) using the camera. If a person appears in the first image, the region including the person may be identified as the ROI. If no person appears in the first image, a new first image is to be, and so on until the first image includes a ROI. During the capturing process, the robot may capture a new first image within the target region by moving and/or rotating itself within the target region.

Since the first image may include, in addition to the person to be detected, other information, such as a tree behind the person to be detected, flowers and, a creek, etc., the robot is to identify the person to be detected from the first image. For example, the person to be detected may be identified by performing a global human search on the first image by means of human contours, face identification, or deep learning.

At block 202, it may be determined whether the ROI indicates an operator by using the feature information extracted from the ROI. The determining method may specifically include, but is not limited to, the following methods. Method 1: when the feature information is face feature information, a similarity between face feature information extracted from the ROI and pre-configured face feature information of the operator may be calculated. It may be determined that the ROI indicates an operator when the similarity is greater than a predetermined threshold. Otherwise, it may be determined that the ROI does not indicate an operator. Method 2: when the feature information is information of a second gesture extracted from a second image, it may be determined whether the second gesture matches a pre-configured gesture password, and it may be determined that the ROI in the first image indicates an operator when the second gesture matches the gesture password. Otherwise, it may be determined that the ROI in the first image does not indicate an operator. Method 3: an operator may be identified manually. For example, an operator may be identified by clicking on an APP interface of a mobile phone manually.

In practical applications, it is not limited to the above three methods to determine whether the ROI in the captured image indicates an operator. For example, it may be also determined whether the ROI indicates an operator, by using other features, such as a human body feature including clothing colour, hair styles, body figures, walking gestures, and so on.

For the Method 1, face feature information of the operator may be pre-configured on the robot. After the ROI is identified from the first image, face feature information may be extracted from the ROI based on the face recognition technique. Then the similarity between the face feature information extracted from the ROI and pre-configured face feature information of the operator may be calculated. When the similarity is greater than a predetermined threshold, it may be determined that the ROI indicates an operator. Otherwise, it may be determined that the ROI does not indicate an operator.

In an example, the similarity between the face feature information extracted from the ROI with the pre-configured face feature information of the operator may be calculated by a feature matching algorithm. In a feasible feature matching algorithm, the face feature information may be extracted from the ROI in the first image, such as Haar feature, Local Binary Pattern (LBP) feature, and Histogram of Oriented Gradients (HOG) feature etc. After that, the extracted face feature information may be sent as an input to a classifier, such as a Support Vector Machine (SVM) classifier, and a Cascade Classifier (CC). The classifier may score the face feature information extracted from the ROI to obtain the similarity between the face feature information and the pre-configured face feature information of the operator, and then determine whether the ROI indicates an operator based on the similarity.

For Method 2, in order to quickly determine whether the ROI indicates an operator, a gesture password may be pre-configured on the robot, wherein the gesture password is used to indicate a gesture of the operator such as a body gesture and hand gesture. If the feature information extracted from the ROI matches the gesture password, it indicates that the robot may be allowed to execute the operation instruction. The gesture password may be a special body gesture or hand gesture. For example, the upper arm and the forearm of one hand are bent 90 degrees relative to each other, the upper arm at shoulder height and the forearm rising upwardly, while the other hand keeps extended downwardly into an angle of about 45 degrees. Such a gesture may form a gesture password. Of course, this is only an example of a gesture password, which may be arbitrarily configured in practical application. The example of the present disclosure does not limit this gesture password. Based on this gesture password, the robot may quickly identify the operator. At the same time, family members, office colleagues and other operators who know the gesture password may also use the gesture password to operate the robot, with high efficiency and accuracy.

In an example, a second image may also be captured using a camera before a first image is captured. The ROI may be identified from the second image and information of the second gesture may be extracted from the ROI. If the information of the second gesture extracted from the ROI matches the pre-configured gesture password, it is deemed that a ROI identified from a first image captured in a follow-up predetermined time (e.g., 3 minutes) indicates the operator, and a new second image is to be re-captured after the predetermined time elapses. If the information of the second gesture extracted from the ROI does not match the pre-configured gesture password, a new second image is to be re-captured.

The first image and the second image are only examples given for convenience of being distinguished. The second image may be used to determine whether the information of the second gesture extracted from the ROI matches the pre-configured gesture password. The first image may be used to acquire the information of the first gesture of the operator.

In an example, the process of analysing the information of the second gesture from the second image and determining whether the second gesture matches the gesture password may include but is not limited to the following methods. The ROI may be identified from the second image; feature extraction of the ROI may be performed to obtain a first feature vector, and the first feature vector may be used as the information of the second gesture extracted from the ROI. Further, a similarity between the first feature vector and the second feature vector corresponding to the gesture password may be calculated. If the similarity is greater than a predetermined threshold, it may be determined that the second gesture matches the gesture password. If the similarity is not greater than the predetermined threshold, it may be determined that the second gesture does not match the gesture password.

In an example, the gesture password may be used for identifying an operator and be pre-configured on the robot. For example, the gesture password may be directly configured by a manufacturer on the robot, and may also be customized by a user on the robot. The robot may also take the initiative to learn the gesture password. As an example, to learn the gesture password, the robot may request the operator to make a body gesture or hand gesture corresponding to the gesture password, and capture an image of the operator, the captured image being a positive sample image. The robot may also request the operator to make a wrong gesture not corresponding to the gesture password, and capture an image of the operator, the captured image being a negative sample image. After obtaining a large number of positive sample images and negative sample images, the robot may use these positive sample images and negative sample images to train a SVM classifier to obtain a second feature vector corresponding to the gesture password. The training process will not be described in detail. Thus, the SVM classifier may compare the similarity between the first feature vector input to the SVM classifier and the second feature vector.

Of course, in practical applications, it is not limited to use the above SVM classifier to train the second feature vector corresponding to the gesture password. For example, other methods such as deep-learning neural networks may be used to train the second feature vector corresponding to the gesture password, and the deep-learning neural networks may be used to compare the similarity between the first feature vector and the second feature vector. Examples of the present disclosure do not impose specific restrictions on the method.

At block 202, if it is determined using the feature information extracted from the ROI that the ROI does not indicate an operator, a new first image including another ROI may be captured in the target region using the camera, and the other ROI is identified from the first image. The process proceeds to block 202.

At block 203, the process of acquiring the information of the first gesture of the operator based on the captured image may include but is not limited to the following method: identifying a region associated with the operator from the first image; performing feature extraction within the identified region to obtain the first feature vector; calculating the similarity between the first feature vector and a second feature vector of each gesture from a group of gesture templates, the second feature vector indicating a possible gesture of the operator; and selecting the gesture having the highest similarity as the information of the first gesture of the operator if the highest similarity is greater than a predetermined threshold.

In an example, to create a new gesture template, the robot may request an operator to make that gesture and capture an image of the operator, the captured image being a positive sample image. The robot may also request the operator to make a wrong gesture not corresponding to any operation instruction and capture an image of the operator, the captured image being a negative sample image. After obtaining a large number of positive sample images and negative sample images, the robot may use these positive sample images and negative sample images to train a SVM classifier to obtain a second feature vector corresponding to the gesture. The training process will not be described in detail. Further, the gesture templates may be maintained, and each gesture from the gesture templates includes the second feature vector corresponding to the gesture. The gesture templates may be pre-defined before the robot is used, or may be customized by a user. After a first feature vector is input to the SVM classifier, the SVM classifier may compare the similarity between the first feature vector and the second feature vector and then may select the gesture having the highest similarity. For the gesture having the highest similarity, if the similarity between the first feature vector and the second feature vector corresponding to the gesture is greater than a predetermined threshold, the second feature vector corresponding to the gesture may be determined as the information of the first gesture of the operator; and if the similarity between the first feature vector and the second feature vector corresponding to the gesture is not greater than the predetermined threshold, a new image may be re-captured to acquire information of the first gesture.

In practical applications, it is not limited to use the SVM classifier to train the second feature vector corresponding to the gesture as described above. For example, other methods such as deep-learning neural networks may be used to train the second feature vector corresponding to the gesture, and the deep-learning neural networks may be used to compare the similarity between the first feature vector and the second feature vector. The example of the present disclosure does not impose specific restrictions on the method.

At block 102, a first operation instruction may be obtained from a group of gestures of an operator, the first operation instruction corresponding to the first gesture. In this example, information of a group of gestures and a group of operation instructions may be first defined, wherein, each gesture from the group of gestures corresponds to an operation instruction from the group of operations.

In an example, before a robot is delivered out of factory, a corresponding relationship between information of gestures and operation instructions may be pre-configured on the robot. Alternatively, after the robot is delivered out of factory, the corresponding relationship between information of gestures and operation instructions may be configured on the robot in a wired or wireless manner. Alternatively, before the robot is delivered out of factory, information of gestures may be pre-configured on the robot, and after the robot is delivered out of factory, operation instructions corresponding to information of gestures may be configured on the robot in a wired or wireless manner. Alternatively, before the robot is delivered out of factory, operation instructions may be pre-configured on the robot. After the robot is delivered out of factory, information of gestures corresponding to operation instructions may be configured on the robot in a wired or wireless manner.

At block 103, in the process of executing the first operation instruction corresponding to the first gesture, the operation instruction may include, but is not limited to, an action instruction, a photographing instruction, an automatic charging instruction, a return-to-origin instruction, a take-off instruction, and a landing instruction. For example, for an intelligent photographing unmanned aerial vehicle, this operation instruction may be an action instruction, for example, flying 1 meter in a particular direction; it may also be a photographing instruction; it may also be a general instruction for a set of complex actions, for example, taking multiple photos by rotating 360 degrees on the spot and then synthesizing them into a panorama photo. In addition, for the robot, this operation instruction may be to return to a charging device to automatically charge, and may also be to put a particular item back to the original place and so on. Of course, only a few examples of operation instructions are given above. In practical applications, it is not limited to the above operation instructions, and the present disclosure does not limit the operation instruction.

In an example, a processor may also be deployed on the robot and the above blocks may be executed by the processor. That is, the processor may acquire information of a first gesture of an operator; query a pre-configured corresponding relationship between information of gestures and operation instructions by using the information of the first gesture to obtain the operation instruction corresponding to the first gesture; execute the operation instruction corresponding to the first gesture. The processor may capture an image using a camera; identify a ROI from the captured image; determine whether the ROI indicates an operator by using the feature information extracted from the ROI; and acquire the information of the first gesture of the operator based on the captured image. The detailed operation of the processor is not repeated here.

In an example, the processor deployed on the robot may specifically include, but is not limited to, a special processor Application Specific Integrated Circuit (ASIC), semi-customized processor Field Programmable Gate Array (FPGA), or a general-purpose processor Central Processing Unit (CPU) and so on.

According to the above technical solution, in an example of the present disclosure, a robot may automatically execute, based on information of a gesture of an operator, an operation instruction corresponding to the gesture without requiring the operator to use a manual remote control to control the robot to perform relevant operations. This has a low requirement for the entry barrier of the operator, and a high operability for the operator so that the robot is accepted by consumers more easily and more widely. Moreover, the robot executes operation instructions more effectively and more accurately.

Figure 3:
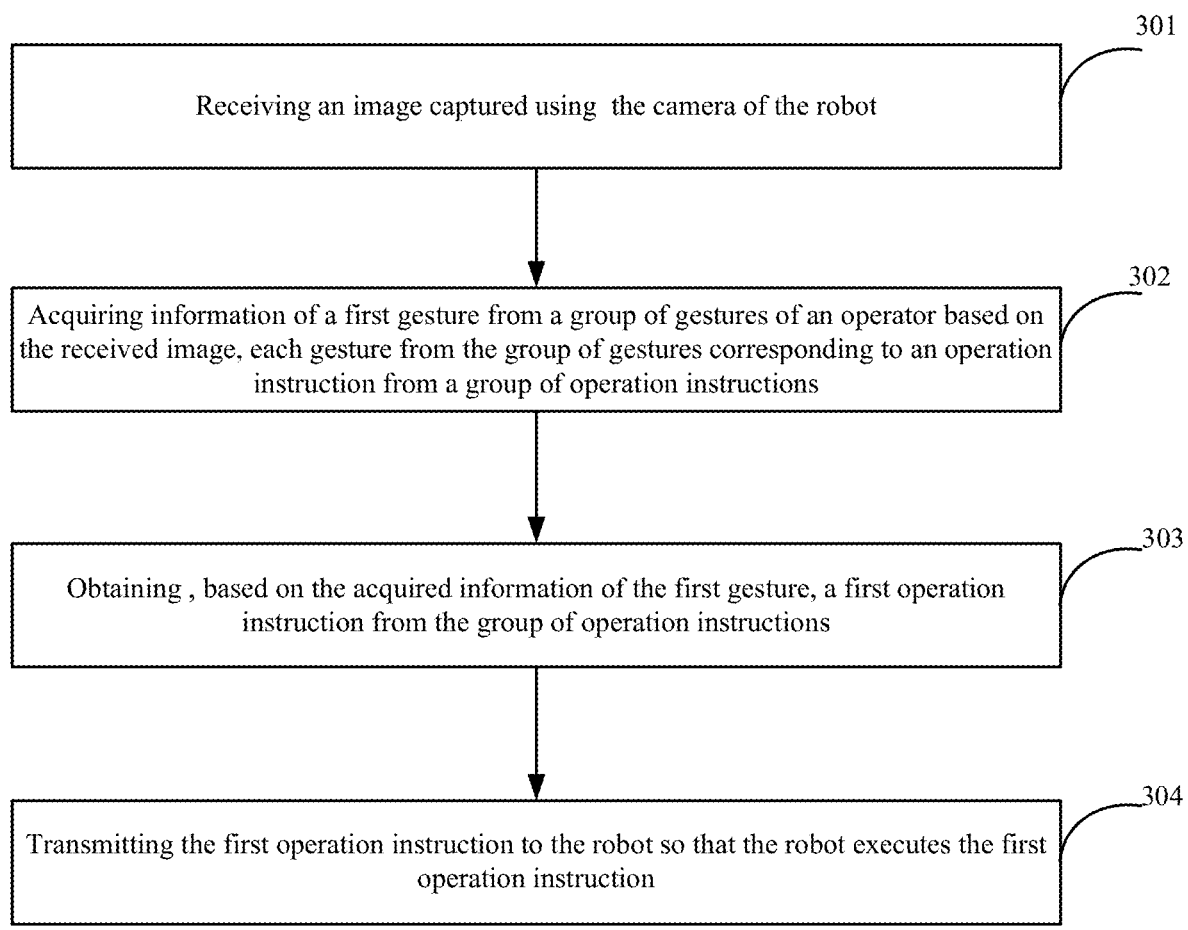
FIG. 3 is a flow diagram of a method of operating a robot in still another example of the present disclosure.

In an example of the present disclosure, a method for operating a robot is provided, which is applied to a network including a robot and a server, and the robot includes a camera. The method for operating the robot may be applied to the server, as shown in FIG. 3, which includes the following blocks.

At block 301, the server may receive an image captured using the camera of the robot.

At block 302, the server may acquire information of a first gesture from a group of gestures of an operator based on the received image, each gesture from the group of gestures corresponding to an operation instruction from a group of operation instructions.

At block 303, the server may obtain, based on the acquired information of the first gesture, a first operation instruction from the group of operation instructions, the first operation instruction corresponding to the first gesture.

At block 304, the server transmits the first operation instruction to the robot so that the robot executes the first operation instruction.

In an example, the server may interact with the robot in a wired or wireless manner.

In an example, the process that the server acquires information of first gesture of an operator may include, but is not limited to, the following method: identifying the ROI from the captured image (hereinafter referred to as a first image); determining whether the ROI indicates an operator using the feature information extracted from the ROI; and acquiring the information of the first gesture of the operator if the ROI indicates the operator.

In an example, the process that the server determines whether the ROI indicates an operator by using the feature information extracted from the ROI may include, but is not limited to, the following methods. When the feature information is face feature information, the server calculates the similarity between face feature information extracted from the ROI and pre-configured face feature information of the operator. The server may determine that the ROI indicates the operator when the similarity is greater than a predetermined threshold. Alternatively, when the feature information is information of a second gesture extracted from a second image, the server may determine whether the second gesture matches a pre-configured gesture password. It may be determined that the ROI identified from the first image indicates the operator if the second gesture matches the pre-configured gesture password. Otherwise, it may be determined that the ROI does not indicate the operator.

In an example, the gesture password is used to indicate a body gesture or hand gesture of an operator, and information of a gesture matching the gesture password indicates that the operation instruction corresponding to the gesture is allowed to be executed.

In an example, the process that the server acquires information of first gesture of the operator based on the first image may include, but is not limited to, the following methods: identifying a region associated with the operator from the first image; performing feature extraction within the region to obtain a first feature vector; calculating the similarity between the first feature vector and a second feature vector of each gesture from a group of gesture templates, the second feature vector indicating a possible gesture of the operator; and selecting the gesture having the highest similarity as the first gesture to be acquired if the highest similarity is greater than a predetermined threshold.

The first gesture includes a static gesture and/or a dynamic gesture wherein the static gesture includes information of a state of a limb, the dynamic gesture includes a movement of a limb; the operation instruction includes: an action instruction, a photographing instruction, an automatic charging instruction, a return-to-origin instruction, a take-off instruction, and a landing instruction.

According to the above technical solution, in an example of the present disclosure, a robot may autonomously execute, based on information of a gesture of an operator, an operation instruction corresponding to the gesture without requiring the operator to use a manual remote control to control the robot to perform relevant operations. This has a low requirement for the entry barrier of the operator, and has a high operability so that the robot is accepted by consumers more easily and more widely used. Moreover, the robot can execute operation instructions more effectively and accurately.

Figure 4:
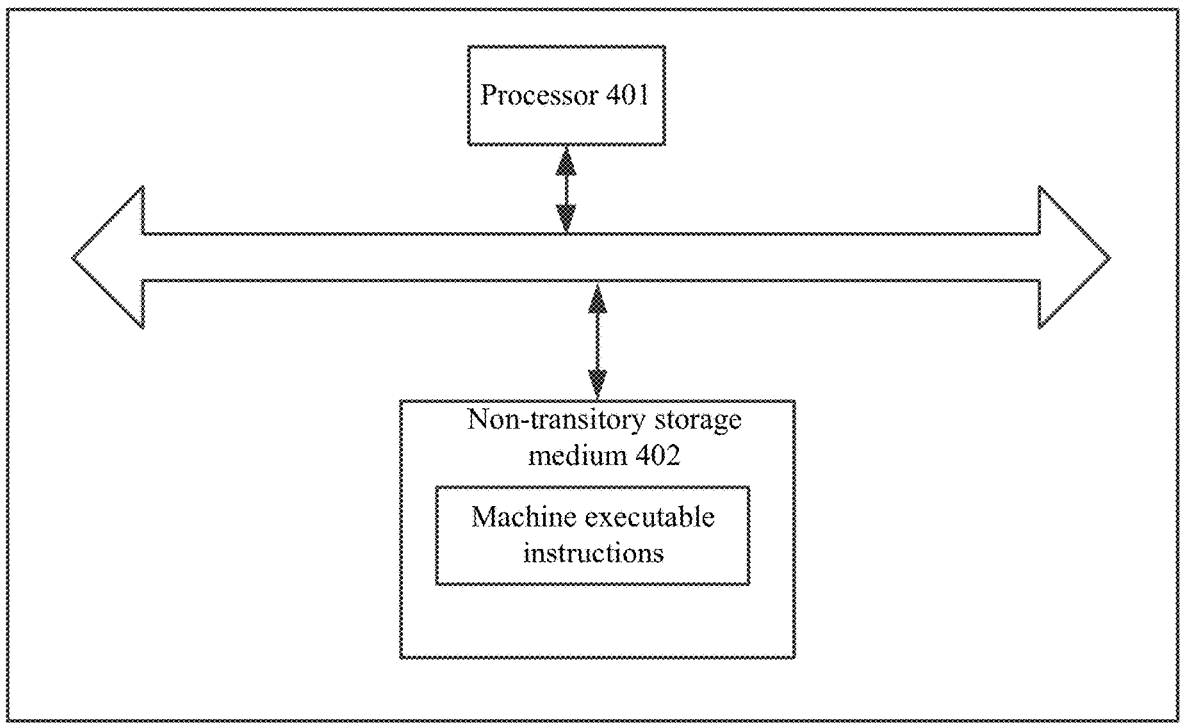
FIG. 4 is a hardware structural diagram of a robot in an example of the present disclosure.

In an example of the present disclosure, a robot is provided. The robot may be implemented by software, may also be implemented by hardware or a combination of hardware and software. In the case of software implementation, a logical device is formed by reading the corresponding machine executable instructions in the non-transitory storage medium by the processor of the robot. FIG. 4 shows a hardware structural diagram of a robot proposed by the present disclosure. In addition to the processor 401 and the non-transitory storage medium 402 shown in FIG. 4, the robot may include other hardware such as a forwarding chip responsible for processing a packet, a network interface, a memory, and so on. In terms of hardware structure, the robot may also be a distributed device that may include multiple interface cards to extend the packet processing at the hardware level.

Figure 5:
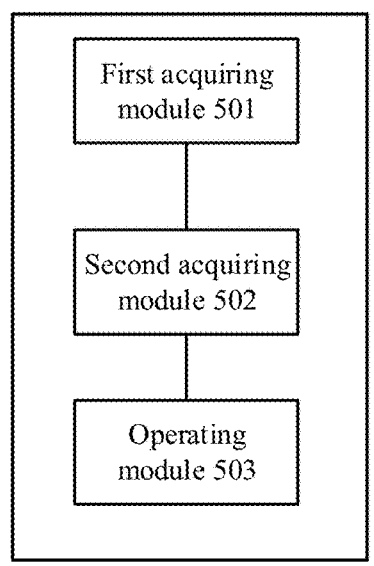
FIG. 5 is a structural diagram of a robot in an example of the present disclosure.

The processor 401 may implement the different blocks of the method for operating the robot as described above by executing the machine-executable instructions in the non-transitory storage medium 402. As shown in FIG. 5, the machine executable instructions may include the following functional modules:

a first acquiring module 501 configured to acquire information of a first gesture from a group of gestures of an operator, each gesture from the group of gestures corresponding to an operation instruction from a group of operation instructions;

a second acquiring module 502 configured to obtain, based on the acquired information of the first gesture, a first operation instruction from the group of operation instructions, the first operation instruction corresponding to the first gesture; and an operating module 503 configured to execute the first operation instruction.

In an example, the robot further includes a camera; the first acquiring module 501 is specifically configured to capture, in the process of acquiring information of first gesture of an operator, an image using the camera and identify an ROI from the captured image; determine whether the ROI indicates the operator; and acquire the information of the first gesture based on the first image if the ROI indicates the operator.

In an example, in the process of determining whether the ROI indicates the operator, when the feature information is face feature information, the first acquiring module 11 is specifically configured to calculate a similarity between face feature information extracted from the ROI and pre-configured face feature information of the operator. It may be determined that the ROI indicates the operator when the similarity is greater than a predetermined threshold. Alternatively, when the feature information is information of a second gesture extracted from a second image, it may be determined whether the second gesture matches a pre-configured gesture password. It may be determined that the ROI in the first image indicates the operator if the second gesture matches the pre-configured gesture password. Otherwise, it may be determined that the ROI does not indicate the operator.

In an example, the gesture password is used to indicate a body gesture or hand gesture of an operator, and to match the gesture password indicates that the operation instruction is allowed to be executed.

In an example, in the process of acquiring the information of the first gesture of the operator, the first acquiring module 501 is specifically configured to, identify a region associated with the operator from the captured image; analyze the identified region to obtain a first feature vector; calculate, for each gesture from the group of gestures, a similarity between the first feature vector and a feature vector of that gesture; and select the gesture having the highest similarity as the first gesture to be acquired.

The first gesture includes a static gesture and/or dynamic gesture, wherein the static gesture information includes information of a state of a limb, the dynamic gesture information includes information of a movement of a limb; the operation instruction includes: an action instruction, a photographing instruction, an automatic charging instruction, a return-to-origin instruction, a take-off instruction, and a landing instruction.

Herein the different modules of the device in the present disclosure may be integrated together or deployed separately. The above modules may be combined into one module, or may also be split into multiple sub-modules.

Figure 6:
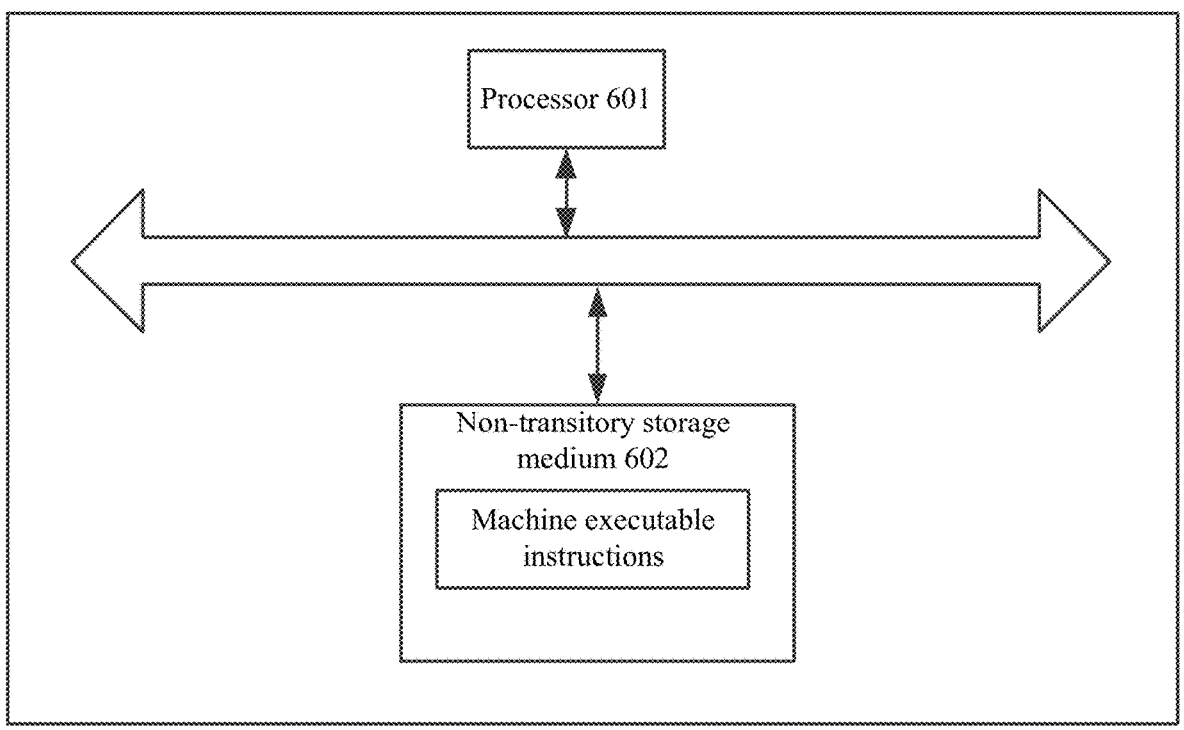
FIG. 6 is a hardware structural diagram of a server in an example of the present disclosure.

In an example of the present disclosure, a device for operating a robot is provided. The device for operating the robot is applied to a server, wherein the device for operating the robot may be implemented by software, may also be implemented by hardware or a combination of hardware and software. In the case of software implementation, a logical device is formed by reading the corresponding machine executable instructions in the non-transitory storage medium by the processor of the server located with the device. FIG. 6 shows a hardware structural diagram of a device for operating a robot proposed by the present disclosure. In addition to a processor 601 and non-transitory storage medium 602 shown in FIG. 6, the server may include other hardware such as a forwarding chip responsible for processing packet, a network interface, a memory, and so on. In terms of a hardware structure, the device for operating robot may also be a distributed device that may include multiple interface cards to extend the packet processing at the hardware level.

Figure 7:
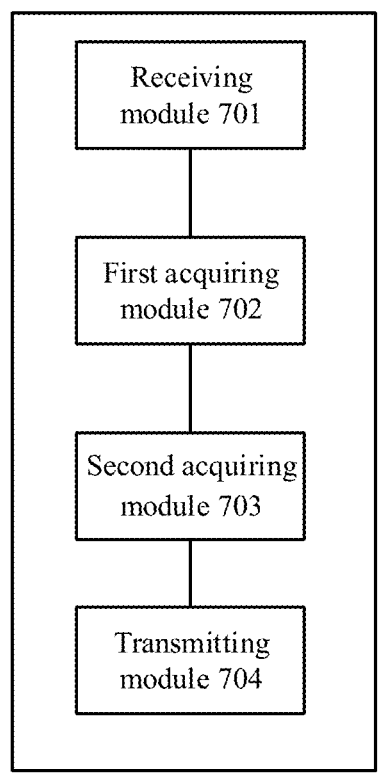
FIG. 7 is a structural diagram of an apparatus for operating a robot in another example of the present disclosure.

The processor 601 may implement different blocks of the method for operating the robot as described above by executing the machine-executable instructions in the non-transitory storage medium 602. As shown in FIG. 7, the machine executable instructions may include the following functional modules:

a receiving module 701 configured to receive an image captured using a camera of the robot;

a first acquiring module 702 configured to acquire, based on the received image, information of a first gesture from a group of gestures of an operator, each gesture from the group of gestures corresponding to an operation instruction from a group of operation instructions;

a second acquiring module 703 configured to obtain, based on the acquired information of the first gesture, a first operation instruction from the group of operation instructions, the first operation instruction corresponding to the first gesture; and a transmitting module 704 configured to transmit the first operation instruction to the robot so as to cause the robot to execute the first operation instruction.

In an example, in the process of acquiring information of first gesture of an operator, the first acquiring module 702 is specifically configured to identify a ROI from the image; determine whether the ROI indicates an operator using the feature information extracted from the ROI; and acquire the information of the first gesture of the operator if the ROI indicates the operator.

In an example, in the process of determining whether the ROI indicates an operator, when the feature information is face feature information, the first acquiring module 702 is specifically configured to calculate a similarity between face feature information extracted from the ROI and pre-configured face feature information of an operator. It may be determined that the ROI indicates the operator when the similarity is greater than a predetermined threshold. Alternatively, when the feature information is information of a second gesture extracted from a second image, it may be determined whether the second gesture matches a pre-configured gesture password. It may be determined that the ROI identified from the first image indicates the operator if the second gesture matches the pre-configured gesture password. Otherwise, it may be determined that the ROI does not indicate the operator.

In an example, the gesture password is used to indicate a body gesture or hand gesture of an operator, and information of a gesture matching the gesture password indicates that the operation instruction corresponding to the gesture is allowed to be executed.

In an example, in the process of acquiring the information of the first gesture, the first acquiring module 702 is specifically configured to, identify a region associated with the operator from the first image; perform feature extraction of the region to obtain a first feature vector; calculate the similarity between the first feature vector and a second feature vector of each gesture from a group of gesture templates, the second feature vector indicating a possible gesture of the operator; and select the gesture having the highest similarity as the first gesture to be acquired.

The first gesture includes a static gesture and/or a dynamic gesture, wherein the static gesture includes information of a state of a limb, the dynamic gesture includes a movement of a limb; the operation instruction includes: an action instruction, a photographing instruction, an automatic charging instruction, a return-to-origin instruction, a take-off instruction, and a landing instruction.

Herein the different modules of the device in the present disclosure may be integrated together or deployed separately. The above modules may be combined into a module, or may also be split into multiple sub-modules.

By way of the description of the above examples, one skilled in the art may clearly appreciate that the present disclosure may be implemented by software plus a necessary generic hardware platform, and of course may also be implemented by hardware, but in many cases the former is a better implementing method. Based on this understanding, the technical solution of the present disclosure may, in essence, or the part contributing to the prior art, may be embodied in the form of a software product. The computer software product is stored in a storage medium, including several instructions for causing a computer device (which may be a personal computer, a server, or a network device, etc.) to perform the method described in the different examples of the present disclosure. It will be understood by those skilled in the art that the accompanying drawings are merely schematic drawings and that the modules or processes in the accompanying drawings are not necessarily essential to the practice of the present disclosure.

It will be understood by those skilled in the art that the modules in the device in an example may be distributed in the device of the example in accordance with the description of the example, or may be changed correspondingly to be located in one or more of the devices different from that of the present example. The modules of the above example may be combined into one module and may be further split into multiple sub-modules. The sequence number of the above examples of the present disclosure is for illustrative purposes only, rather than indicate the merits of the examples.

The terminology used in the present disclosure is for the purpose of describing particular examples only, and is not intended to be limiting of the present disclosure. The singular forms such as "a", 'said", and "the" used in the present disclosure and the claims are also intended to include the plural forms, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, in addition, the used word "if" may be interpreted as "when" or "as" or "determining in response to".

Disclosed above are only a few specific examples of the present disclosure, but the present disclosure is not intended to be limited thereto, and any changes that may occur to those skilled in the art should fall within the scope of the present disclosure.

The invention claimed is:

1. A method of operating a robot, comprising:
   acquiring information of a first gesture from a group of gestures, each gesture from the group of gestures corresponding to an operation instruction from a group of operation instructions;
   obtaining, based on the acquired information of the first gesture, a first operation instruction from the group of operation instructions, the first operation instruction corresponding to the first gesture; and
   executing the first operation instruction;
   wherein acquiring the information of the first gesture comprises:
   capturing an image using a camera;
   identifying a Region Of Interest (ROI) from the captured image;
   determining whether the ROI includes an operator of the robot; and acquiring, using the captured image, the information of the first gesture after it is determined that the ROI includes the operator.

2. The method according to claim 1, wherein determining whether the ROI includes the operator comprises:
calculating a similarity between face feature information of the ROI and pre-configured face feature information of the operator; and
determining that the ROI includes the operator when the calculated similarity is greater than a predetermined threshold.

3. The method according to claim 1, wherein the image is a first image, the method further comprises capturing a second image using the camera, the determining whether the ROI includes the operator comprises:
acquiring, based on the second image, information of a second gesture;
determining whether the second gesture matches a pre-configured gesture password; and
determining that the ROI of the first image includes the operator when the second gesture matches the pre-configured gesture password.

4. The method according to claim 3, wherein the pre-configured gesture password is associated with a posture or gesture of the operator, the method further comprises:
executing the first operation instruction from the group of operation instructions when the second gesture matches the pre-configured gesture password.

5. The method according to claim 1, wherein acquiring the information of the first gesture comprises:
identifying, from the captured image, a region associated with the operator;
analyzing the identified region to obtain a first feature vector;
calculating, for each gesture from the group of gestures, a similarity between the first feature vector and a feature vector of that gesture; and
selecting the gesture having the highest similarity as the first gesture to be acquired.

6. The method according to claim 1, wherein
the first gesture is a static gesture; and
the information of the first gesture comprises information of a status of a limb.

7. The method according to claim 1, wherein
the first gesture is a dynamic gesture; and
the information of the first gesture comprises information of a movement of a limb.

8. A robot, comprising:
a processor; and
a non-transitory storage medium storing machine-executable instructions,
wherein by executing the machine-executable instructions, the processor is caused to:
acquire information of a first gesture from a group of gestures, each gesture from the group of gestures corresponding to an operation instruction from a group of operation instructions;
obtain, based on the acquired information of the first gesture, a first operation instruction from the group of operation instructions, the first operation instruction corresponding to the first gesture; and
execute the first operation instruction;
wherein when the processor is caused to acquire the information of the first gesture, the machine-executable instructions further cause the processor to:
capture an image using a camera;
identify a Region Of Interest (ROI) from the captured image;
determine whether the ROI includes an operator of the robot; and
acquire, using the captured image, the information of the first gesture after it is determined that the ROI includes the operator.

9. The method according to claim 1, wherein the group of operation instructions comprise an action instruction, a photographing instruction, an automatic-charging instruction, a return-to-origin instruction, a take-off instruction, and a landing instruction.

10. The robot according to claim 8, wherein when the processor is caused to determine whether the ROI includes the operator, the machine-executable instructions further cause the processor to:
calculate a similarity between face feature information of the ROI and pre-configured face feature information of the operator; and
determine that the ROI includes the operator when the calculated similarity is greater than a predetermined threshold.

11. The robot according to claim 8, wherein the image is a first image, when the processor is caused to determine whether the ROI includes the operator, the machine-executable instructions further cause the processor to:
capture a second image using the camera;
acquire, based on the second image, information of a second gesture;
determine whether the second gesture matches a pre-configured gesture password; and
determine that the ROI of the first image includes the operator when the second gesture matches the pre-configured gesture password.

12. The robot according to claim 11, wherein the pre-configured gesture password includes a posture or gesture of the operator, the machine-executable instructions further cause the processor to:
execute the first operation instruction from the group of operation instructions when the second gesture matches the pre-configured gesture password.

13. The robot according to claim 8, wherein when the processor is caused to acquire the information of the first gesture, the machine-executable instructions further cause the processor to:
identify, from the captured image, a region associated with the operator;
analyze the identified region to obtain a first feature vector;
calculate, for each gesture from the group of gestures, a similarity between the first feature vector and a feature vector of that gesture; and
select the gesture having the highest similarity as the first gesture to be acquired.

14. The robot according to claim 8, wherein
the first gesture is a static gesture; and
the information of the first gesture comprises information of a status of a limb.

15. The robot according to claim 8, wherein
the first gesture is a dynamic gesture; and
the information of the first gesture comprises information of a movement of a limb.

16. The robot according to claim 8, wherein the group of operation instructions comprise an action instruction, a photographing instruction, an automatic-charging instruction, a return-to-origin instruction, a take-off instruction, and a landing instruction.

17. An apparatus for operating a robot, comprising:
a processor; and
a non-transitory storage medium storing machine-executable instructions,
wherein by executing the machine-executable instructions, the processor is caused to:
receive an image captured using a camera of the robot;
acquire, based on the received image, information of a first gesture from a group of gestures, each gesture from the group of gestures corresponding to an operation instruction from a group of operation instructions;
obtain, based on the acquired information of the first gesture, a first operation instruction from the group of operation instructions, the first operation instruction corresponding to the first gesture; and
transmit the first operation instruction to the robot such that the robot executes the first operation instruction;
wherein when the processor is caused to acquire the information of the first gesture, the machine-executable instructions further cause the processor to:
capture an image using a camera;
identify a Region Of Interest (ROI) from the captured image;
determine whether the ROI includes an operator of the robot; and
acquire, using the captured image, the information of the first gesture after it is determined that the ROI includes the operator.

18. A method of operating a robot, comprising:
receiving, at a server, an image captured using a camera of the robot;
acquiring, at the server and based on the received image, information of a first gesture from a group of gestures, each gesture from the group of gestures corresponding to an operation instruction from a group of operation instructions;
obtaining, at the server and based on the acquired information of the first gesture, a first operation instruction from the group of operation instructions, the first operation instruction corresponding to the first gesture; and
transmitting, from the server to the robot, the first operation instruction such that the robot executes the first operation instruction;
wherein acquiring the information of the first gesture comprises:
capturing an image using a camera;
identifying a Region Of Interest (ROI) from the captured image;
determining whether the ROI includes an operator of the robot; and
acquiring, using the captured image, the information of the first gesture after it is determined that the ROI includes the operator.

* * * * *